United States Patent
Dow et al.

(10) Patent No.: US 9,769,596 B2
(45) Date of Patent: Sep. 19, 2017

(54) MOBILE DEVICE OUTPUT TO EXTERNAL DEVICE

(71) Applicant: International Business Machines Corporation, Armonk, NY (US)

(72) Inventors: Eli M. Dow, Wappingers Falls, NY (US); James P. Gilchrist, Poughkeepsie, NY (US); Steven K. Schmidt, Essex Junction, VT (US); Charles J. Stocker, IV, Plainsboro, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/950,123

(22) Filed: Nov. 24, 2015

(65) Prior Publication Data

US 2017/0150295 A1    May 25, 2017

(51) Int. Cl.
| | |
|---|---|
| *H04B 7/00* | (2006.01) |
| *H04W 4/00* | (2009.01) |
| *H04M 1/725* | (2006.01) |
| *G06F 3/0484* | (2013.01) |
| *G06F 3/0485* | (2013.01) |
| *G06F 3/0488* | (2013.01) |
| *G06F 3/01* | (2006.01) |

(52) U.S. Cl.
CPC ............ *H04W 4/008* (2013.01); *G06F 3/017* (2013.01); *G06F 3/0485* (2013.01); *G06F 3/04845* (2013.01); *G06F 3/04883* (2013.01); *H04M 1/7253* (2013.01)

(58) Field of Classification Search
None
See application file for complete search history.

(56) References Cited

U.S. PATENT DOCUMENTS

| | | |
|---|---|---|
| 8,369,893 B2 | 2/2013 | Kirch et al. |
| 8,547,342 B2 | 10/2013 | Stallings et al. |
| (Continued) | | |

FOREIGN PATENT DOCUMENTS

| | | |
|---|---|---|
| EP | 2283421 A2 | 2/2011 |
| EP | 2514104 A2 | 10/2012 |

OTHER PUBLICATIONS

Eli M. Dow, et al.,"Mobile Device Output to External Device", U.S. Appl. No. 15/078,035, filed Mar. 23, 2016.

(Continued)

*Primary Examiner* — Mohammed Rachedine
(74) *Attorney, Agent, or Firm* — Cantor Colburn LLP; Steven Chiu (57) ABSTRACT

A method for outputting content to an external device comprises receiving with a mobile device, a signal from a first external device, identifying a direction of the first external device relative to the mobile device, receiving a user input action on the mobile device that corresponds to the identified direction of the first external device relative to the mobile device, initiating a communicative connection between the mobile device and the first external device responsive to receiving the user input action that corresponds to the identified direction of the first external device relative to the mobile device, and outputting content from the mobile device to the first external device via the communicative connection.

11 Claims, 10 Drawing Sheets

(56) References Cited

U.S. PATENT DOCUMENTS

| | | |
|---|---|---|
| 2010/0138780 A1 | 6/2010 | Marano et al. |
| 2010/0156812 A1* | 6/2010 | Stallings ............. G06F 3/04883 |
| | | 345/173 |
| 2011/0065459 A1* | 3/2011 | Cheng ................... H04W 4/023 |
| | | 455/457 |
| 2011/0151926 A1 | 6/2011 | Kim et al. |
| 2012/0131458 A1 | 5/2012 | Hayes |
| 2012/0229400 A1* | 9/2012 | Birnbaum ............... G06F 3/016 |
| | | 345/173 |
| 2012/0322367 A1 | 12/2012 | Kee |
| 2013/0157630 A1 | 6/2013 | Cheng et al. |

OTHER PUBLICATIONS

List of IBM Patent Applications Treated as Related; Date Filed: Nov. 24, 2015, pp. 1-2.

\* cited by examiner

MOBILE DEVICE OUTPUT TO EXTERNAL DEVICE

BACKGROUND

The present invention relates to mobile devices, and more specifically, to mobile device data output to an external device.

Mobile devices such as smartphones, tablets, and personal computers, often include touch screens that receive user inputs by touching the screen. The devices often also include accelerometers and other sensors that allow a user to provide inputs by moving the device in particular motions.

Mobile devices also include wireless transmitters and software that allows content from the mobile devices to be sent to external devices such as other mobile devices, personal computers, televisions, projectors, video screens, audio devices, and other external devices. The content may include textual, video, slides, audio, or live streaming of the content shown on the display of the mobile device.

SUMMARY

According to an embodiment of the present invention, a method for outputting content to an external device comprises receiving with a mobile device, a signal from a first external device, identifying a direction of the first external device relative to the mobile device, receiving a user input action on the mobile device that corresponds to the identified direction of the first external device relative to the mobile device, initiating a communicative connection between the mobile device and the first external device responsive to receiving the user input action that corresponds to the identified direction of the first external device relative to the mobile device, and outputting content from the mobile device to the first external device via the communicative connection.

According to another embodiment of the present invention, a system comprises a mobile device having a processor operative to receive a signal from a first external device, identify a direction of the first external device relative to the mobile device, receive a user input action on the mobile device that corresponds to the identified direction of the first external device relative to the mobile device, initiate a communicative connection between the mobile device and the first external device responsive to receiving the user input action that corresponds to the identified direction of the first external device relative to the mobile device, and output content from the mobile device to the first external device via the communicative connection.

According to yet another embodiment of the present invention, a computer program product comprising a computer readable storage medium having program instructions embodied therewith, the program instructions executable by a processor to cause the processor to perform a method that comprises receiving with a mobile device, a signal from a first external device, identifying a direction of the first external device relative to the mobile device, receiving a user input action on the mobile device that corresponds to the identified direction of the first external device relative to the mobile device, initiating a communicative connection between the mobile device and the first external device responsive to receiving the user input action that corresponds to the identified direction of the first external device relative to the mobile device, and outputting content from the mobile device to the first external device via the communicative connection.

DETAILED DESCRIPTION

The systems and methods described herein provide for a mobile device to receive a user input to initiate a communicative connection to an external device such as, for example, a display or audio output device. The mobile device is operative to determine a position of the external device relative to the position of the mobile device. The user may perform an input action such as, for example, a gesture or swipe on the mobile device screen in the direction of the external device that the user desires to use to present data or content from the mobile device. The system is operative to distinguish and recognize the relative position of multiple external devices in a given space.

Figure 1:
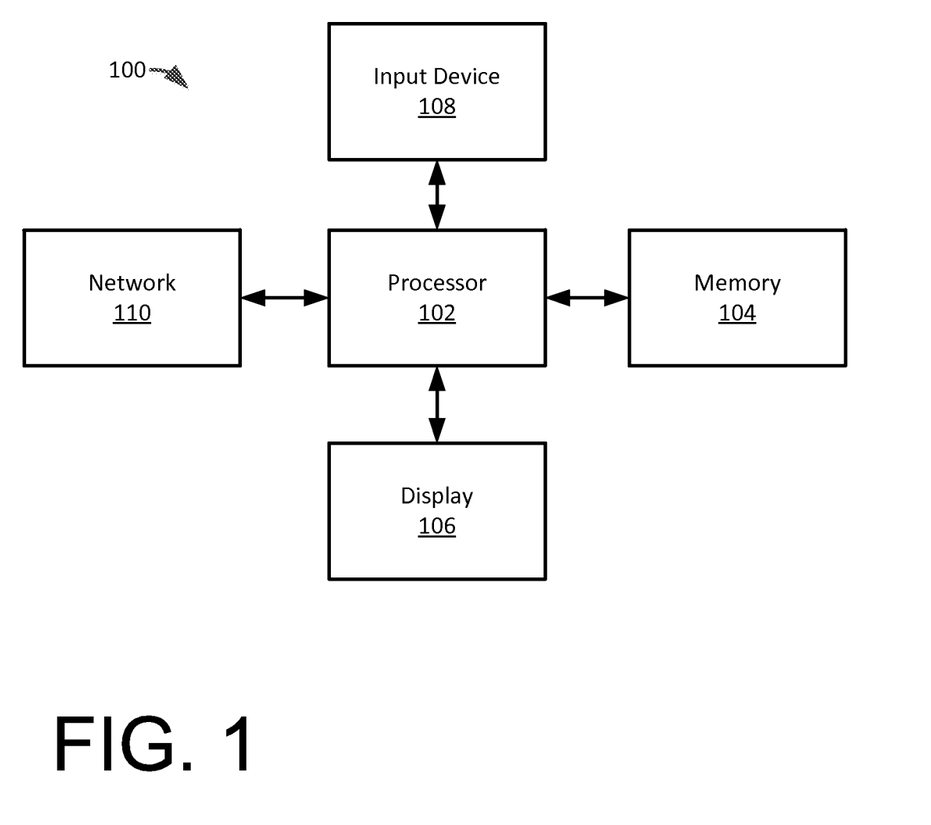
FIG. 1 illustrates a block diagram of an exemplary embodiment of a system.

In this regard, FIG. 1 illustrates a block diagram of an exemplary embodiment of a system 100 that includes a processor 102 that is communicatively connected to a memory 104, a display 106, an input device 108 and a network 110.

Figure 2:
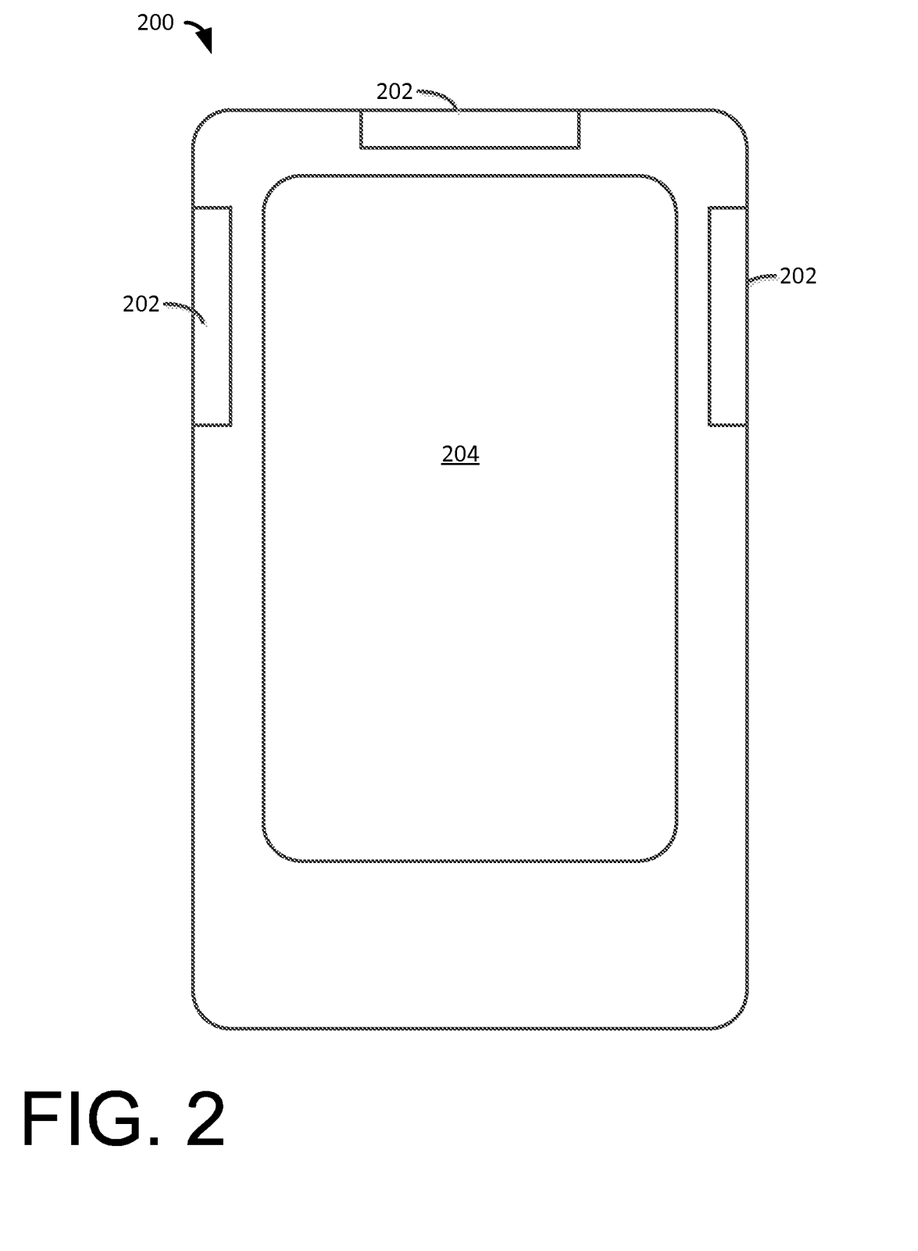
FIG. 2 illustrates an exemplary embodiment of a mobile device.

FIG. 2 illustrates an exemplary embodiment of a mobile device 200 that includes the system 100 (of FIG. 1). The mobile device 200 may include, for example, a smartphone, tablet, mobile personal computer, or any other suitable type of mobile device. The mobile device 200 includes a touchscreen display 204, and sensors 202. The touchscreen 204 is operative to receive touch inputs from a user which may include, for example, gestures using one or more fingers such as swiping gestures or scrolling gestures. A swiping gesture includes, for example, a user touching the touchscreen 204 with a finger and dragging their finger in a particular direction on the touchscreen 204 while maintaining contact between the finger of the user and the touch screen 204.

The sensors 202 may include any type of sensor that is operative to receive a signal from an external device. In one exemplary embodiment, the sensors 202 are operative to receive and sense inferred signals. In other embodiments, the sensors 202 may include audio sensing devices such as microphones. Alternatively, the sensors 202 may include antennas or other devices operative to receive signals from an external device.

The mobile device 200 may also include accelerometers (not shown) that may sense the motion of the mobile device 200. Such accelerometers may sense the motion of the mobile device 200 when the user makes a gesture with the mobile device 200 such as, for example, shaking the mobile device 200, or moving the mobile device towards an object such as, an external device or point in space.

Figure 3:
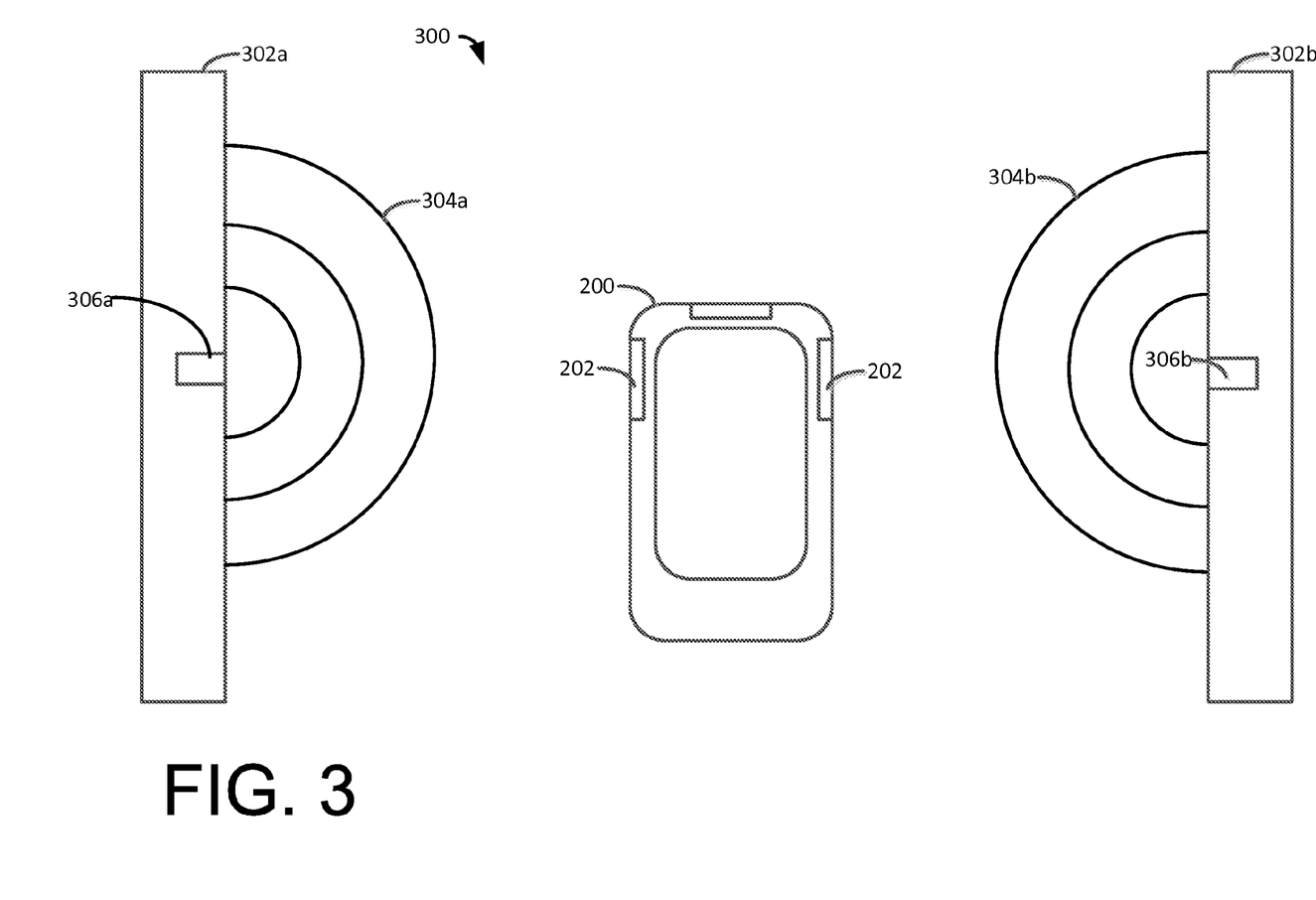
FIG. 3 illustrates an exemplary embodiment of a system that includes the mobile device, a first external device and a second external device.

FIG. 3 illustrates an exemplary embodiment of a system 300 that includes the mobile device 200, a first external device 302*a* and a second external device 302*b*. The external devices 302 may include any type of device or system that is operative to present content to a user, for example, a monitor, television, display, projector, audio system, audio/video system, or any combination of these systems. The external devices 302 include emitters 306*a* and 306*b* respectively that are operative to emit unique signals 304*a* and 304*b*. The emitters 306 may emit any type of suitable signal. In the illustrated exemplary embodiment 304, the emitters 306 are operative to emit an inferred signal. In alternate exemplary embodiments, the emitters, may emit for example, sound signals, light signals, or other types of electromagnetic signals.

In the illustrated embodiment, the sensors 202 of the mobile device 200 are operative to receive the signals 304*a* and 304*b* from the external devices 302*a* and 302*b* respectively and determine a direction from which the signals 304*a* and 304*b* originated from relative to the orientation of the mobile device 200. The mobile device 200 in the illustrated embodiment has more than one sensor 202, the mobile device 200 may use any suitable method for determining the direction from which the signals 304*a* and 304*b* originated from. In alternative embodiments, the mobile device 200 may only have a single sensor 202. The mobile device 200 may, for example, compare the strengths of the signals received from the external devices 302. Rotating the mobile device 200 changes the relative orientation of the sensors 200 to the emitters 306, and thus may be used to determine a relative direction of the external devices 302 to the orientation of the mobile device 200.

The signals 304 output from the external devices 302 may include data in any suitable format that may include for example, a unique identifier of the external device 302, a description of the external device such as, the type of device 302 (e.g., display, audio device, audio/video system), the operational specifications of the device 302 (e.g., display type, resolution, color, size), communication protocols or schemes supported by the device (e.g., wireless protocols), and any other data that facilitates a communicative connection between the mobile device 200 and the external devices 302.

Figure 4:
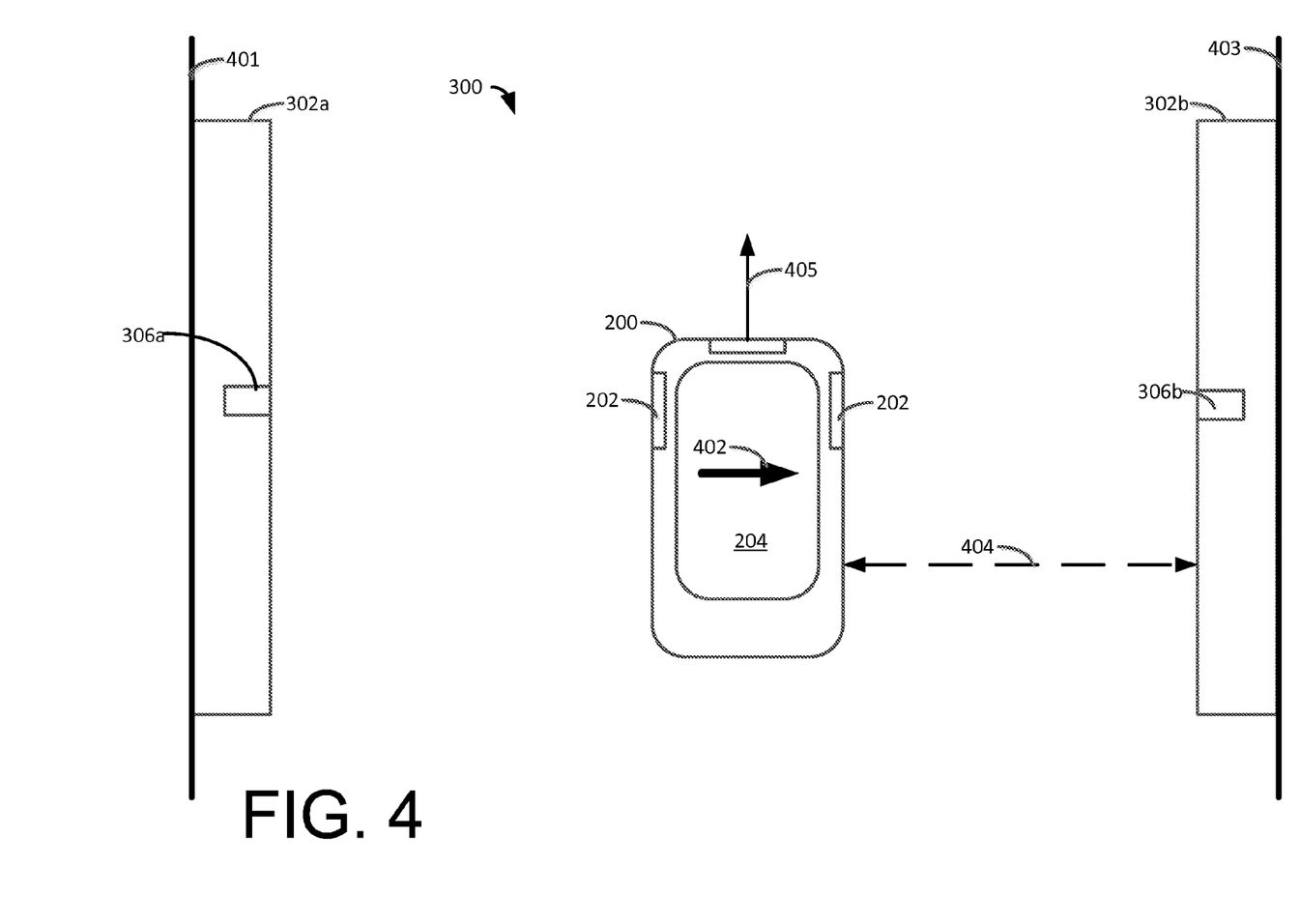
FIG. 4 illustrates a block diagram of an exemplary method of operation of the system of FIG. 3.

FIG. 4 illustrates a block diagram of an exemplary method of operation of the system 300. In this regard, the system 300 may be arranged in an environment such as, for example a conference room. In the illustrated example, the first external device 302*a* is arranged on a first wall 401, and the second external device 302*b* is arranged on a second wall 403 that opposes the first wall 401. The mobile device 200 is arranged between the first wall 401 and the second wall 403.

In operation, the sensors 202 on the mobile device 200 receive signals from the emitters 306*a* and 306*b*. The mobile device 200 processes the received signals and determines a direction relative to the orientation of the mobile device 200 of the external device 302*a* and the external device 302*b*. In the illustrated example, the arrow 405 indicates the front of the mobile device 202 where the external device 302*a* is orientated to the left of the mobile device 202 and the external device 302*b* is orientated to the right of the mobile device 202.

The mobile device 200 receives the signals from the emitters 306 and may process the signals to identify specifications of each of the external devices 302. Once the mobile device 200 determines the relative orientation, direction, or position of the external devices 302, and other relevant information about the external devices 302 such as, the type of external device 302, and communication protocols or standards supported by each of the external devices 302, the user may perform an input action to identify which external device the user would like to use to present content that is sent from the mobile device 202 to the selected external device 302. In this regard, the input action of the user is a swipe gesture on the touchscreen 204 that is in the direction of the external device 302*b*. In the illustrated example, the arrow 402 illustrates the path of a finger of the user on the touch screen 204. Thus, the user may swipe or gesture towards the external device 302*b* when the user would like content sent from the mobile device 204 to the external device 302*b*. The content may include any type of data such as visual, graphical, video, audio, textual or other information that may be sent from the mobile device 204 to the external device 302*b*. Once the user makes the input action, a communicative connection 404 is initiated between the mobile device 200 and the second external device 302*b*. In the illustrated exemplary embodiment, the external device 302*b* includes a video screen and audio output such that once the communicative connection 404 is established between the mobile device 200 and the external device 302*b*, the mobile device 200 may send video and audio to the external device 302*b* for display on the screen of the external device 302*b*. Audio associated with the video may be output by the external device 302*b* or another system that is associated with the external device 302*b*.

Figure 5:
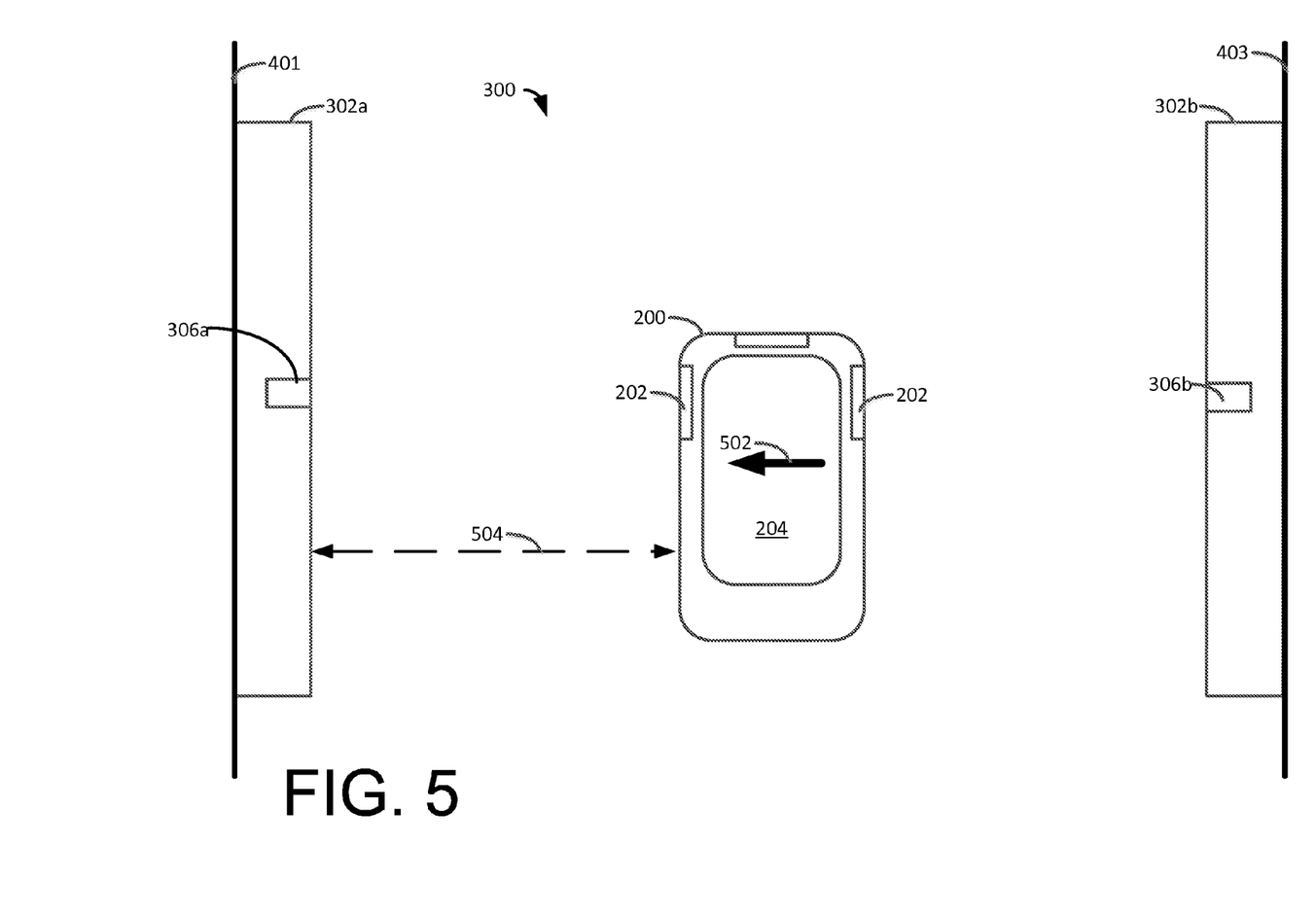
FIG. 5 illustrates a block diagram of another exemplary method of operation of the system of FIG. 3.

FIG. 5 further illustrates an example of the operation of an embodiment of the system 300. In this regard, the user has performed an input action such as a swipe in the direction of the arrow 502 on the touch screen 204 of the mobile device 200. The input action is in the direction of the first external device 302*a*. Once the mobile device 200 has received the user input action that is in the direction of the external device 302*a*, a communicative connection 504 is initiated between the external device 302*a* and the mobile device 200. As discussed above, the mobile device 200 may send any type of suitable content to the external device 306*a* for presentation to the user on the external device 302*a*.

Figure 6A:
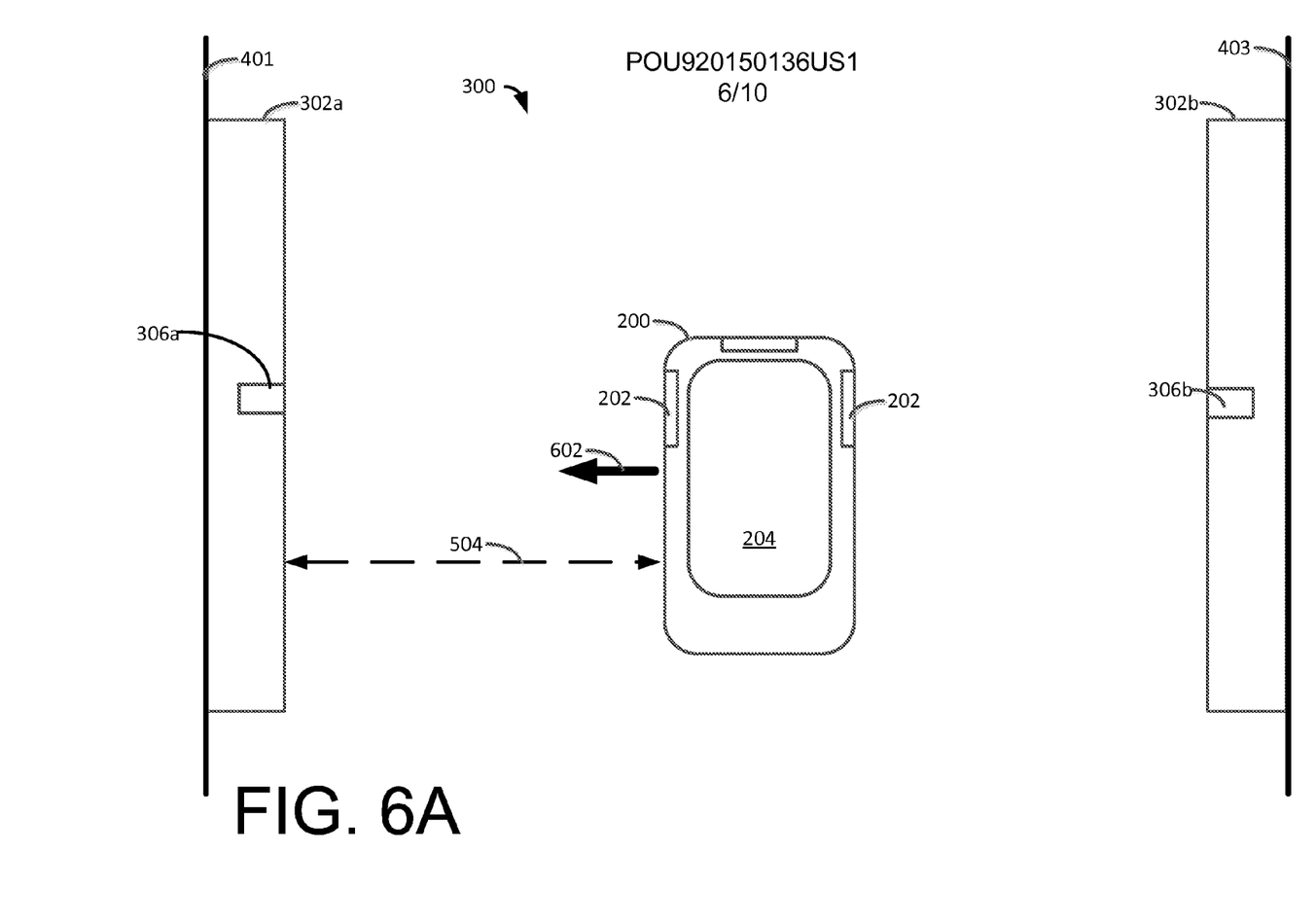
FIGS. 6A and 6B illustrate a block diagram of another exemplary method of operation of the system of FIG. 3.
Figure 6B:
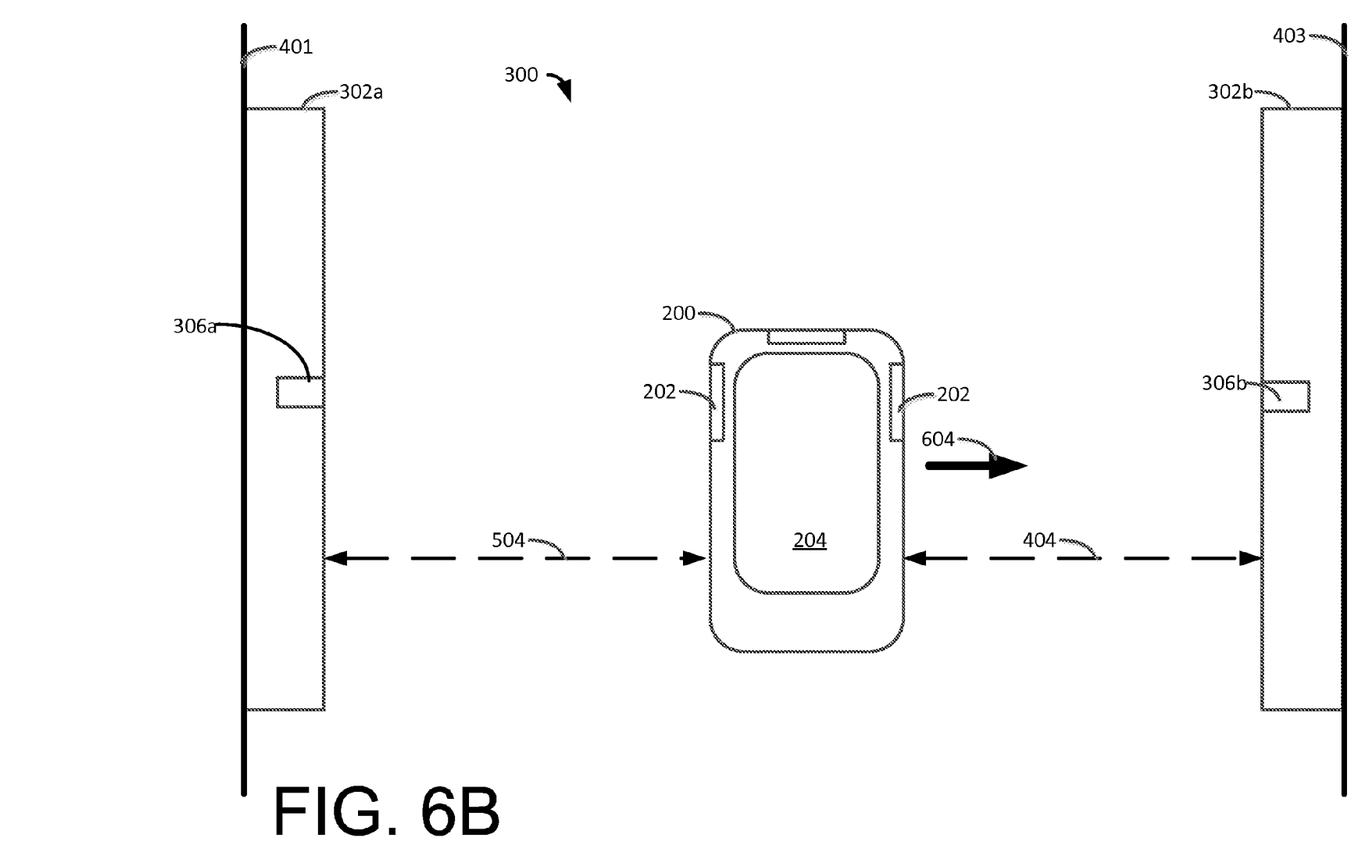

FIGS. 6A and 6B illustrate another example of operation of an exemplary embodiment of the system 300. Referring to FIG. 6A, after the mobile device 200 receives signals from the emitters 306*a* and 306*b* and determined a location of the external devices 302*a* and 302*b* relative to the orientation of the mobile device 200, the user performs an input action that includes accelerating the mobile device 200 substantially along the arrow 602 in the direction of the first external device 302*a*. Following the user input action that indicates that the user would like to display content on the first external device 302*a*, a communicative connection 504 is made between the mobile device 200 and the first external device 302*a*. Once the communicative connection 504 is established, content may be sent from the mobile device 200 to the first external device 302*a* and presented to the user on the external device 302*a*.

FIG. 6B illustrates a subsequent user input action where the user has accelerated the mobile device 200 in a direction substantially along the arrow 604 in the direction of the second external device 302b. Following the user input action, a communicative connection 404 is established between the mobile device 200 and the second external device 302b. Following the establishment of the communicative connection 404, content may be sent from the mobile device 200 to the second external device 302b and presented to the user on the second external device 302b. The content sent to the second external device 302b may be the same or different content than the content sent to the first external device 302a.

Although the illustrated exemplary embodiments described herein include one mobile device 200 and two external devices 302, alternate exemplary systems may include any number of mobile devices and external devices 302.

Figure 7:
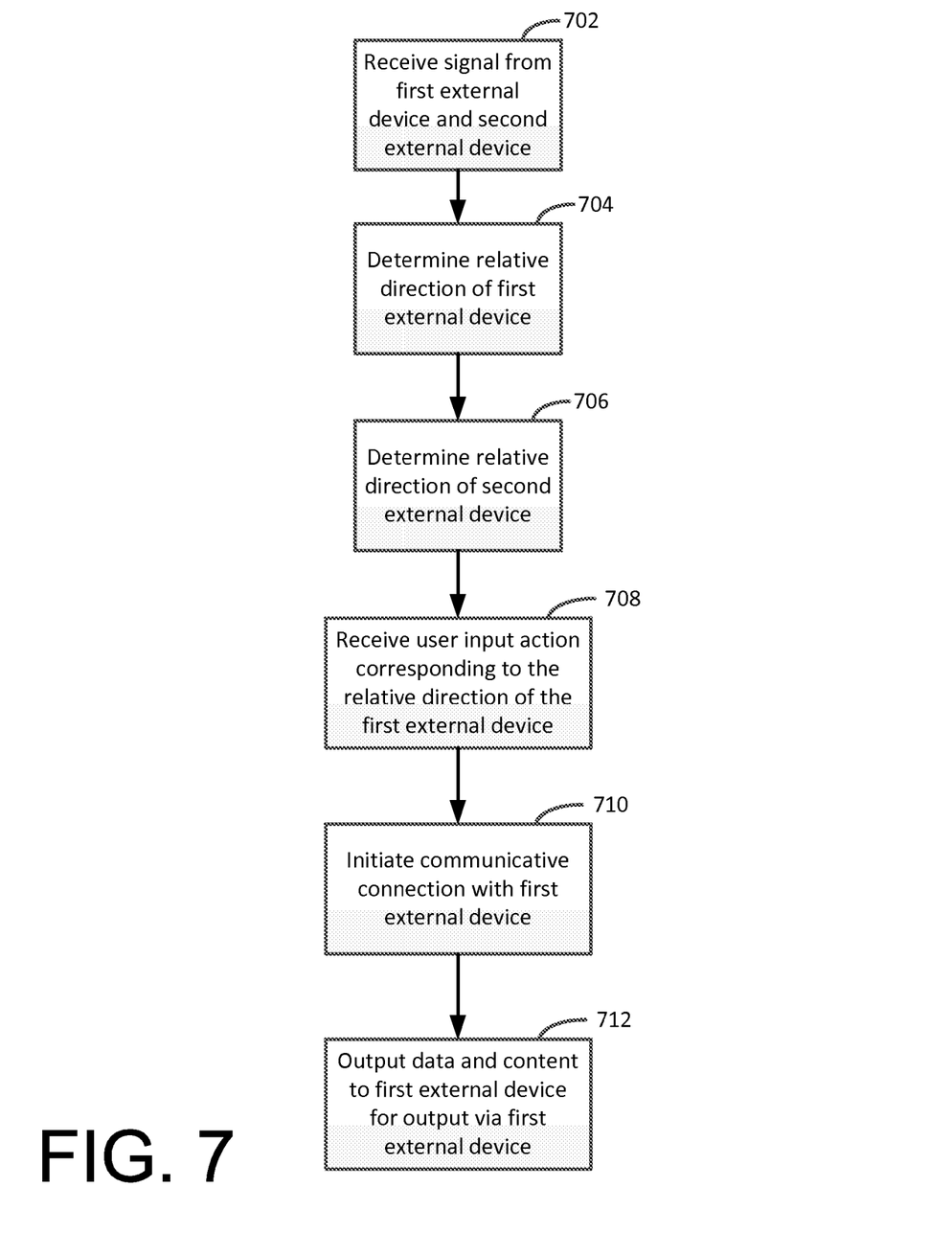
FIG. 7 illustrates a block diagram of an exemplary method of operation of an exemplary embodiment of the mobile device of FIG. 2.

FIG. 7 illustrates a block diagram of an exemplary method of operation of an exemplary embodiment of the mobile device 200 (of FIG. 2). In block 702, the mobile device 200 receives a signal from the first external device 302a (of FIG. 3) and the second external device 302b. In block 704, the mobile device 200 processor determines the position of the first external device 302a relative to the orientation of the mobile device 200. In block 706, the mobile device 200 processor determines the position of the second external device 302b relative to the orientation of the mobile device 200. In block 708, the mobile device 200 receives an input action (e.g., swipe, or acceleration in the direction of the first external device 302a) that corresponds to the relative direction of the first external device 302a. A communicative connection is initiated and established between the mobile device 200 and the first external device 302a in block 710. In block 712, the mobile device 200 outputs data and content to the first external device 302a for presentation to the user on the first external device 302a.

Figure 8A:
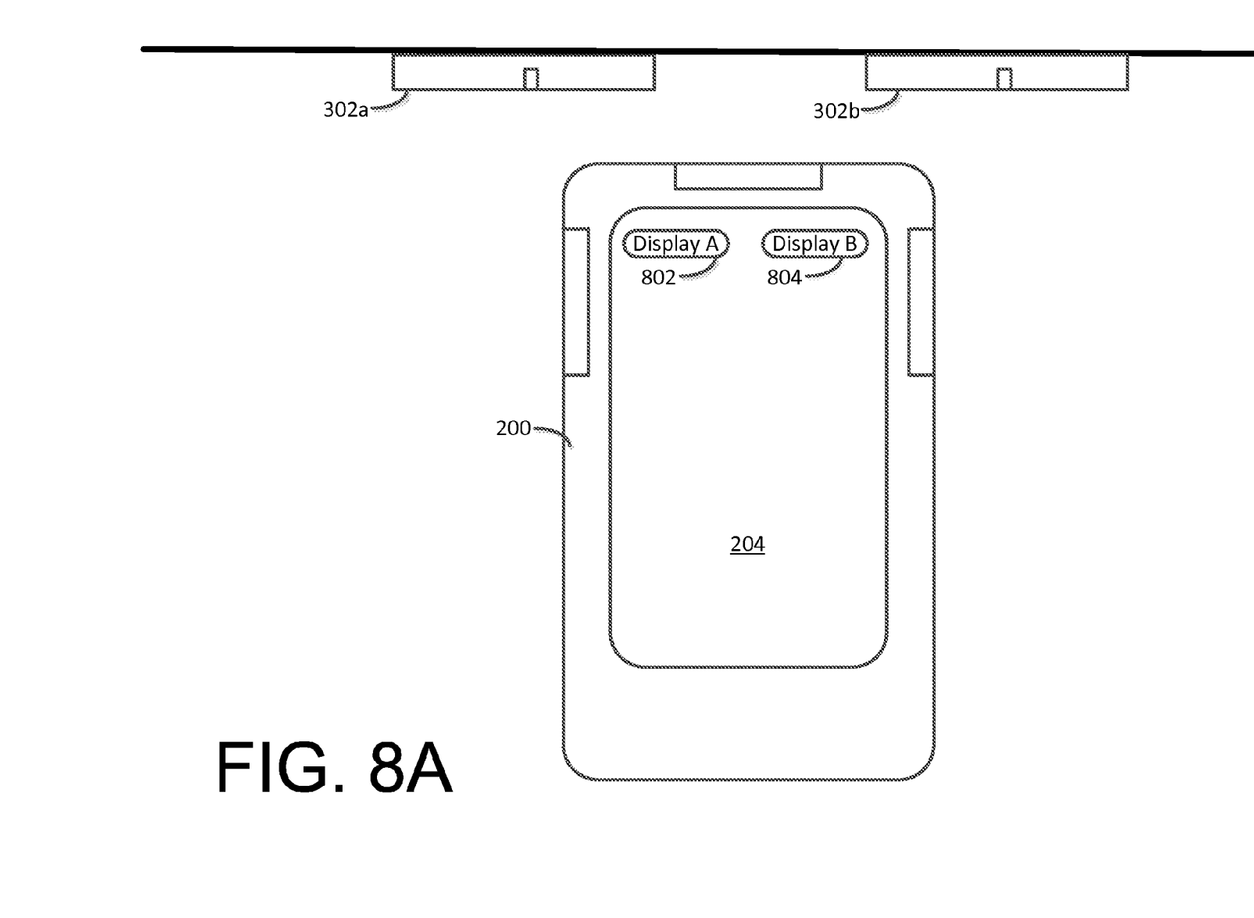
FIGS. 8A and 8B illustrate another exemplary method of operation of the system.
Figure 8B:
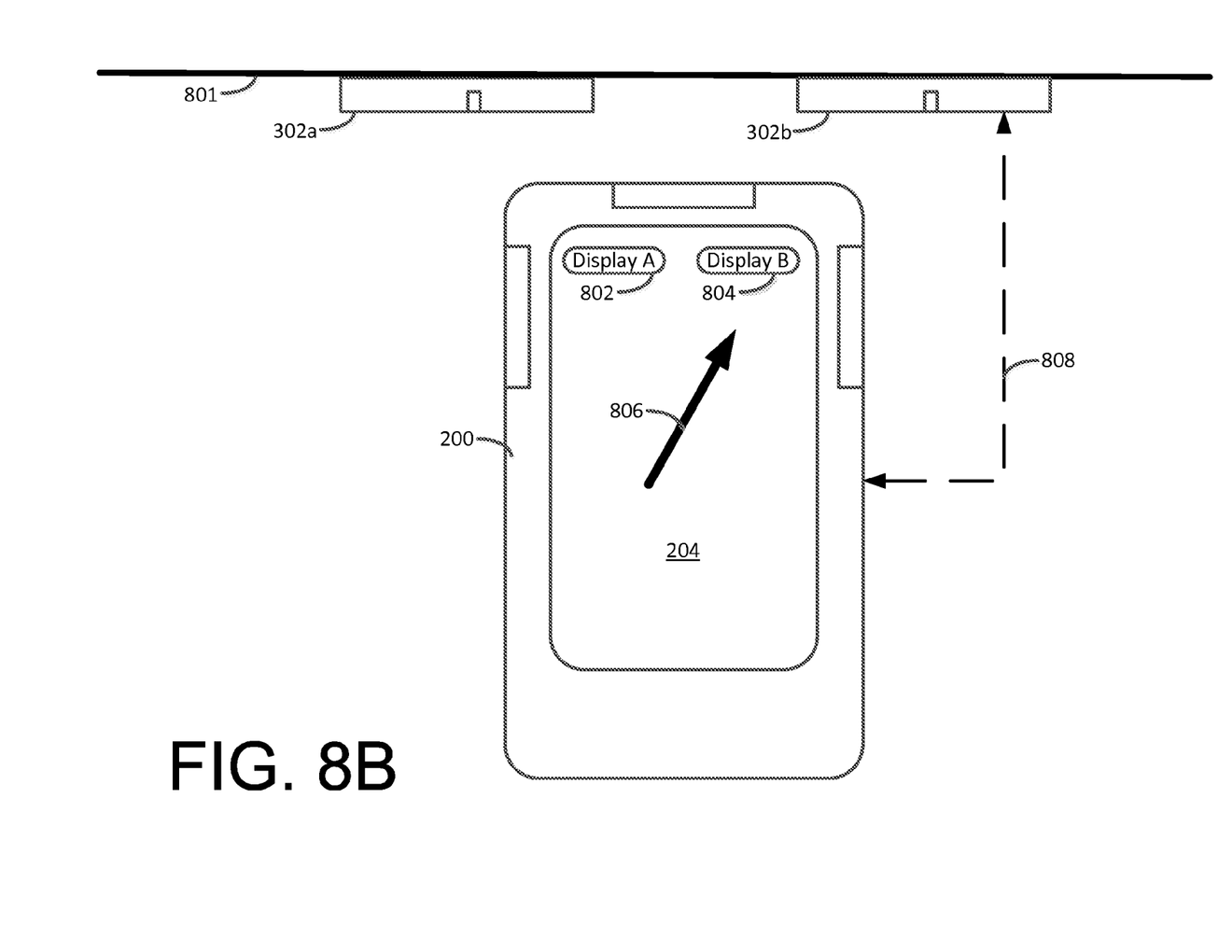

FIGS. 8A and 8B illustrate another exemplary method of operation of the system 300 (of FIG. 3). In this regard, referring to FIG. 8A, the external devices 302a and 302b are arranged on a wall 801. The proximity of the external devices 302a and 302b to each other may cause some ambiguity as to a direction that a user would direct an input action to choose which external device 302a or 302b to initiate a communicative connection with the mobile device 200. When the mobile device 200 determines that external devices 302a and 302b are in close proximity to each other, the mobile device 200 may display graphical or textual representations 802 and 804 on the screen 204 that represent the relative locations of the external devices 302a and 302b.

Referring to FIG. 8B, the user has performed an input action in the direction of the arrow 806, which is towards the graphical representation 804 of the external device 302b. The input action initiates the establishment of a communicative connection 808 between the mobile device 200 and the external device 302b. Once the communicative connection 808 has been established, the mobile device 200 may send content to the external device 302b for presentation to the user on the external device 302b.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a mobile device having a processor operative to:
receive a signal from a first external device with a first sensor, wherein the first sensor is one of a plurality of sensors that are disposed on different portions of the mobile device;
identify a direction of the first external device relative to the mobile device by using the signal received by the first sensor, wherein the direction is identified based at least in part on a location of the first sensor on the mobile device;
receive a user input action on the mobile device that corresponds to the identified direction of the first external device relative to the mobile device;
initiate a communicative connection between the mobile device and the first external device responsive to receiving the user input action that corresponds to the identified direction of the first external device relative to the mobile device; and
output content from the mobile device to the first external device via the communicative connection.

2. The system of claim 1, wherein the processor is further operative to:
receive a signal from a second external device;
identify a direction of the second external device relative to the mobile device;
receive a user input action on the mobile device that corresponds to the identified direction of the second external device relative to the mobile device;
initiate a communicative connection between the mobile device and the second external device responsive to receiving the user input action that corresponds to the identified direction of the second external device relative to the mobile device; and
output content from the mobile device to the second external device via the communicative connection.

3. The system of claim 1, wherein the signal from the first external device is an infrared signal.

4. The system of claim 1, wherein the user input action includes a swipe of a finger of a user on a touch screen of the mobile device that is substantially in the direction of the first external device.

5. The system of claim 1, wherein the user input action includes an acceleration of the mobile device substantially in the direction of the first external device.

6. The system of claim 1, wherein the first external device includes a display screen.

7. A computer program product comprising a non-transitory computer readable storage medium having program instructions embodied therewith, the program instructions executable by a processor to cause the processor to perform a method comprising:
receiving with a first sensor of the mobile device, a signal from a first external device, wherein the first sensor is one of a plurality of sensors that are disposed on different portions of the mobile device;
identifying a direction of the first external device relative to the mobile device by using the signal received by the first sensor, wherein the direction is identified based at least in part on a location of the first sensor on the mobile device;
receiving a user input action on the mobile device that corresponds to the identified direction of the first external device relative to the mobile device;
initiating a communicative connection between the mobile device and the first external device responsive to receiving the user input action that corresponds to the identified direction of the first external device relative to the mobile device; and outputting content from the mobile device to the first external device via the communicative connection.

8. The computer program product of claim 7, the method further comprising:
  receiving with the mobile device, a signal from a second external device;
  identifying a direction of the second external device relative to the mobile device;
  receiving a user input action on the mobile device that corresponds to the identified direction of the second external device relative to the mobile device;
  initiating a communicative connection between the mobile device and the second external device responsive to receiving the user input action that corresponds to the identified direction of the second external device relative to the mobile device; and
  outputting content from the mobile device to the second external device via the communicative connection.

9. The computer program product of claim 7, wherein the signal from the first external device is an infrared signal.

10. The computer program product of claim 7, wherein the user input action includes a swipe of a finger of a user on a touch screen of the mobile device that is substantially in the direction of the first external device.

11. The computer program product of claim 7, wherein the user input action includes an acceleration of the mobile device substantially in the direction of the first external device.

\* \* \* \* \*